(12) United States Patent
Koch et al.

(10) Patent No.: US 7,271,370 B2
(45) Date of Patent: Sep. 18, 2007

(54) YARN GUIDING GODET WITH MAGNETIC BEARINGS

(75) Inventors: Thomas Koch, Wermelskirchen (DE); Heiner Kudrus, Barmstedt (DE)

(73) Assignee: Saurer GmbH & Co. KG, Monchengladbach (DE)

( * ) Notice: Subject to any disclaimer, the term of this patent is extended or adjusted under 35 U.S.C. 154(b) by 690 days.

(21) Appl. No.: 10/719,826

(22) Filed: Nov. 21, 2003

(65) Prior Publication Data

US 2004/0118894 A1  Jun. 24, 2004

Related U.S. Application Data

(63) Continuation of application No. PCT/EP02/05398, filed on May 16, 2002.

(30) Foreign Application Priority Data

May 21, 2001 (DE) .................. 101 24 626
Jun. 21, 2001 (DE) .................. 101 29 979

(51) Int. Cl.
 *H05B 6/14* (2006.01)
 *H02K 7/09* (2006.01)
(52) U.S. Cl. ..................... 219/619; 310/90.5
(58) Field of Classification Search ............. 219/619, 219/618, 469, 470, 471, 648, 647; 100/300, 100/301; 310/90.5, 90; *H05B 6/14; H02K 7/09*
See application file for complete search history.

(56) References Cited

U.S. PATENT DOCUMENTS

| 3,562,472 A | 2/1971 | Cannon et al. |
| 3,772,492 A | 11/1973 | Brogden et al. |
| 4,350,861 A | 9/1982 | Pouillange et al. |
| 5,525,780 A * | 6/1996 | Moslehi ............... 219/618 |
| 6,278,094 B1 * | 8/2001 | Rindfleisch et al. ....... 219/619 |
| 6,288,465 B1 * | 9/2001 | Suzuki et al. ............. 310/90.5 |
| 6,545,255 B2 * | 4/2003 | Sato et al. ................. 219/619 |
| 6,713,919 B2 * | 3/2004 | Kudrus et al. ............ 310/90.5 |
| 2002/0005405 A1 * | 1/2002 | Sato et al. ................. 219/667 |
| 2002/0113508 A1 * | 8/2002 | Kudrus et al. ............ 310/90.5 |
| 2004/0118894 A1 * | 6/2004 | Koch et al. ................. 226/188 |
| 2005/0199613 A1 * | 9/2005 | Samei et al. ............... 219/619 |

FOREIGN PATENT DOCUMENTS

| DE | 197 33 239 A1 | 2/1999 |
| DE | 198 43 990 C1 | 8/2002 |
| EP | 0 607 586 A1 | 7/1994 |
| EP | 0 770 719 A1 | 5/1997 |
| WO | WO 02/068834 A1 | 9/2002 |

\* cited by examiner

*Primary Examiner*—Daniel Robinson
(74) *Attorney, Agent, or Firm*—Alston & Bird LLP

(57) ABSTRACT

A godet for guiding at least one advancing yarn in a yarn processing operation. The godet comprises a tubular casing which is mounted for free rotation on a support by means of a plurality of bearings. At least one of the bearings is a radially operative magnetic bearing, which comprises a rotating part and a stationary part attached to the support, with a bearing gap formed between the parts. The stationary part includes at least one pole element with an excitation winding, and the rotating part is made of at least one laminated component of a magnetizable material which is fixed on the inner side of the tubular casing. The pole element and the laminated component cooperate for guiding a magnetic flux.

13 Claims, 6 Drawing Sheets

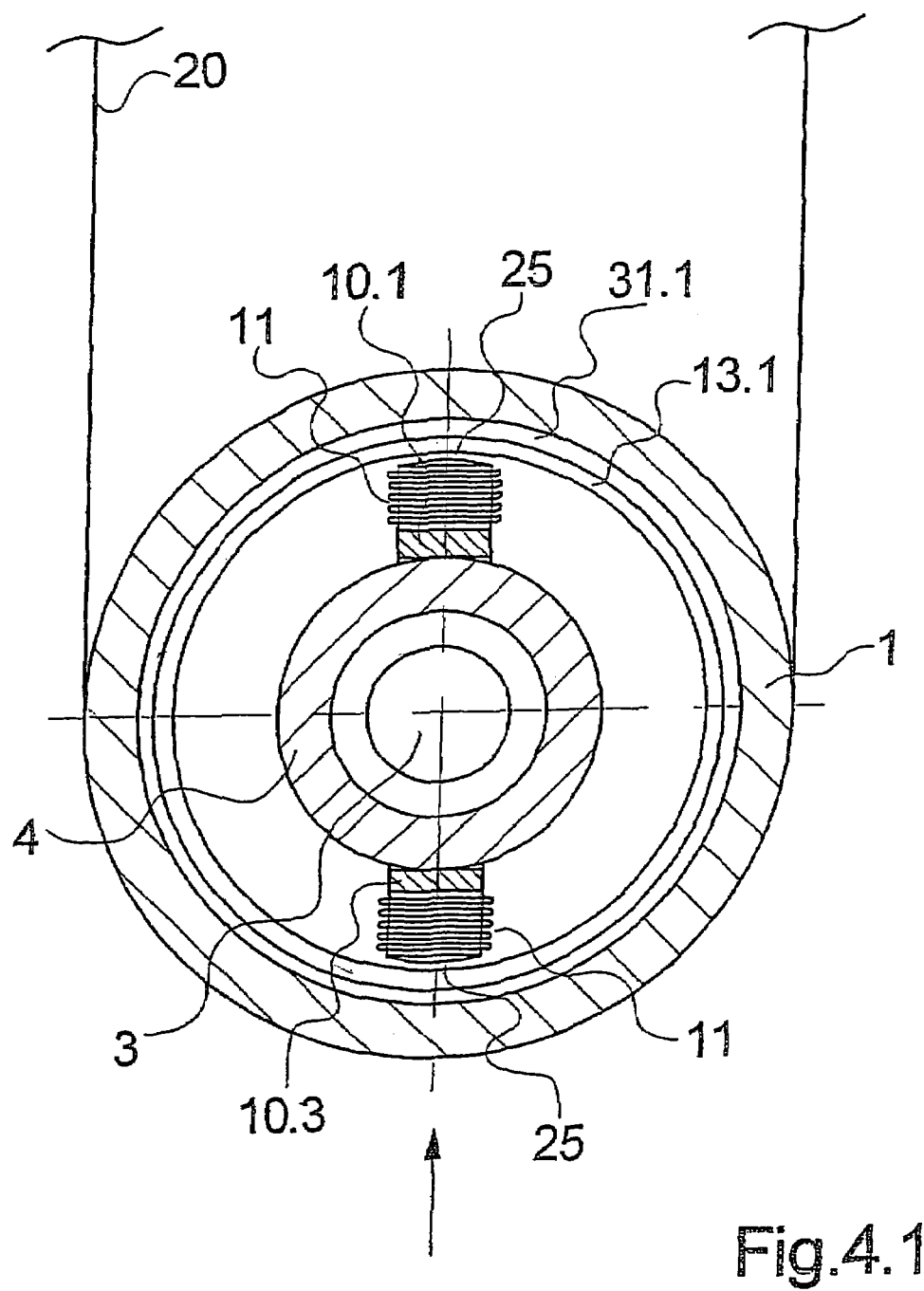
Fig.4.1

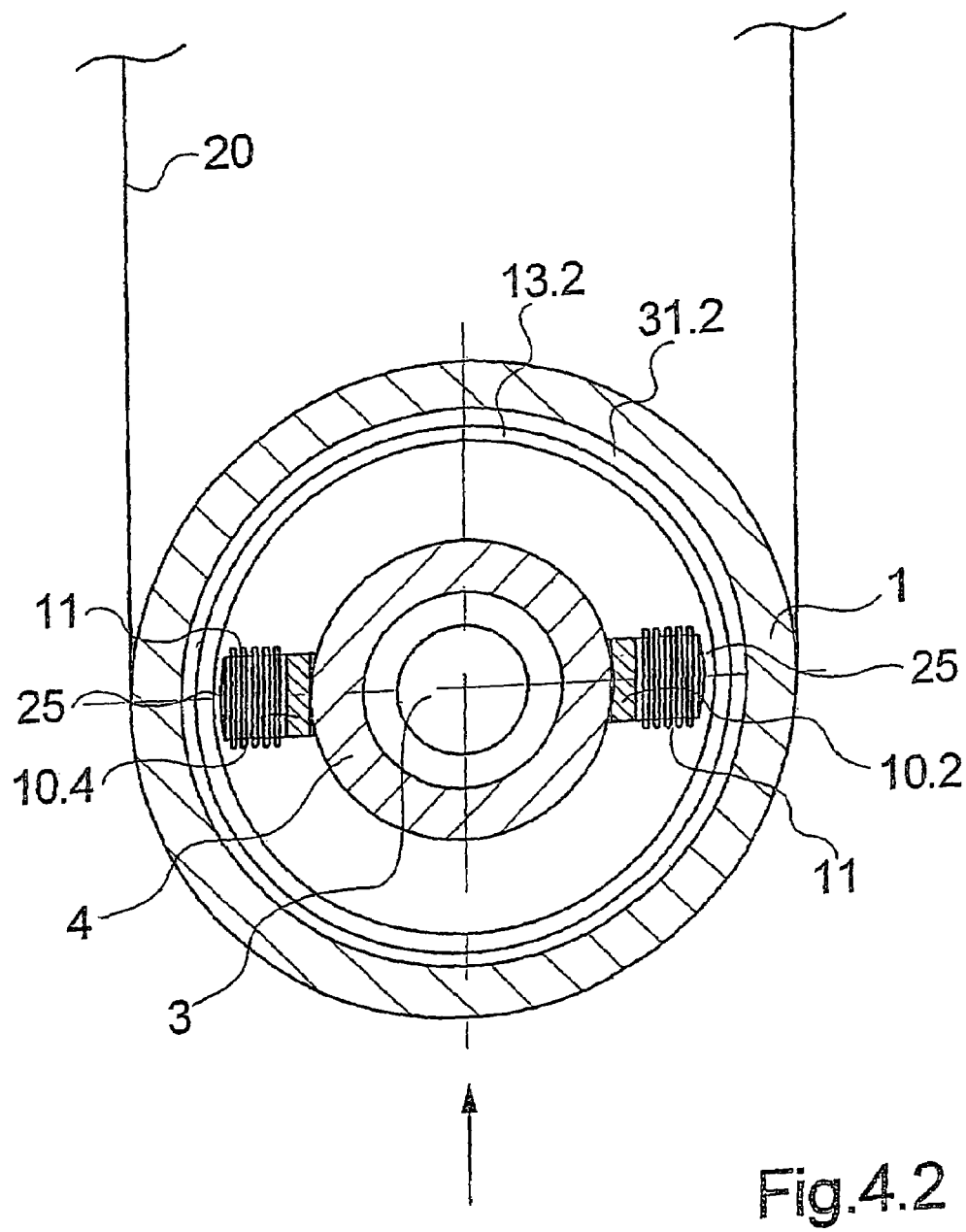
Fig.4.2

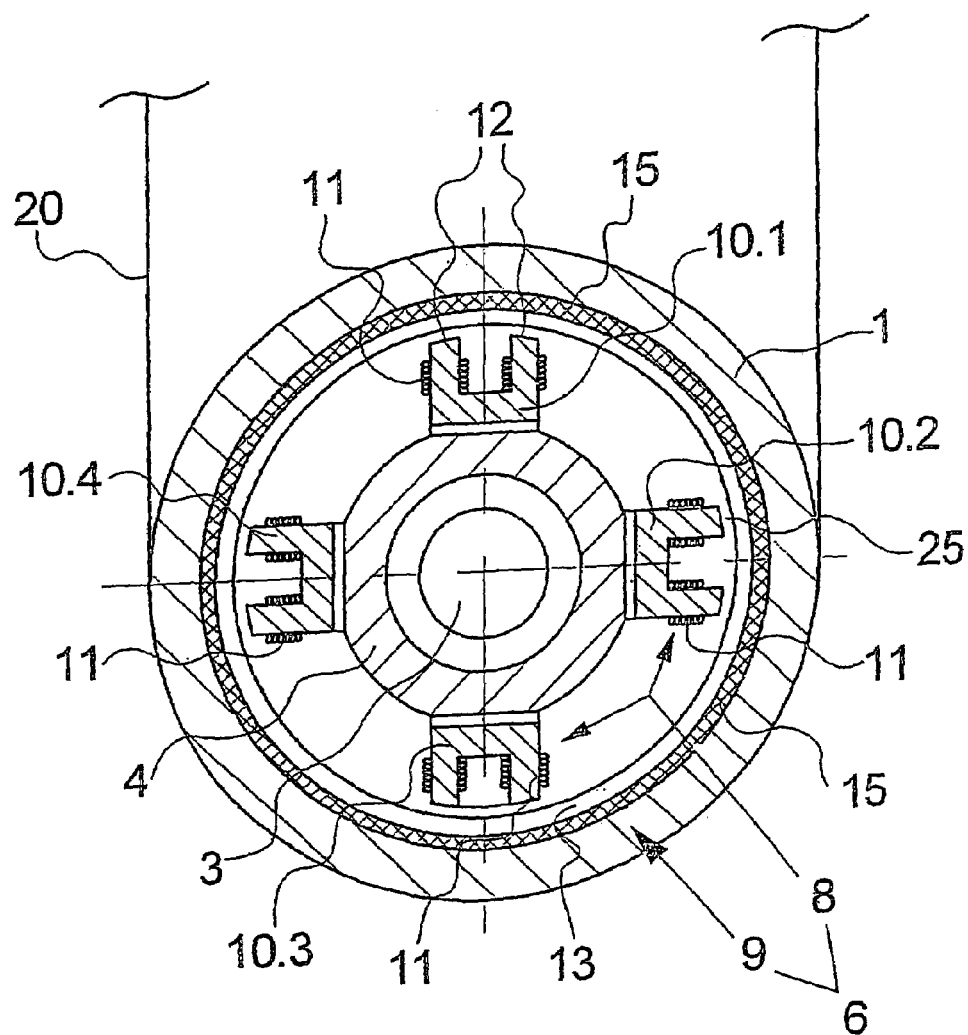
Fig.5.1
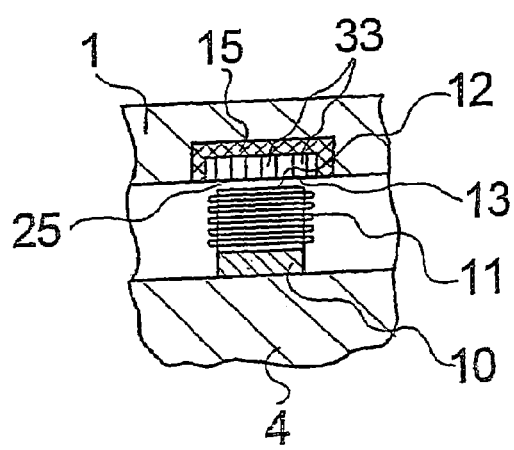
Fig.5.2

YARN GUIDING GODET WITH MAGNETIC BEARINGS

CROSS REFERENCE TO RELATED APPLICATION

The present application is a continuation of international application PCT/EP02/05398, filed May 16, 2002, and which designates the U.S. The disclosure of the referenced application is incorporated herein by reference.

BACKGROUND OF THE INVENTION

The invention relates to a godet for guiding at least one advancing yarn as part of a yarn processing operation, and which utilizes one or more radially operative magnetic bearings.

A godet of the described type is disclosed in DE 197 33 239 A1. In this prior godet, a hollow-cylindrical godet casing is magnetically mounted on a projecting support. To this end, a plurality of radially operative magnetic bearings are provided, which are basically formed by a rotating part and a stationary part. In this connection, one needs to distinguish between a passive magnetic bearing and an active magnetic bearing. The invention relates to the active, radially operative magnetic bearing, wherein the stationary part of the magnetic bearing is formed by at least one pole element, which mounts one or more windings. The pole elements include pole ends, which face the rotating part of the magnetic bearing in a bearing gap.

In the known godet, the rotating part of the magnetic bearing is formed by a shaft connected to the godet casing, or directly by the godet casing. In this case, the materials of the shaft or the godet casing must be of such a quality that a closed magnetic flux develops between the pole ends. This makes it necessary to select the materials for the shaft or godet casing, while taking into account a magnetization, and to consider the requirements for meeting the component functions. A further disadvantage of the known godet lies in that hysteresis losses or eddy current losses as well as possible leakage losses occur during the transition of the magnetic flux into the shaft or the godet casing. Such losses must be covered, if need be, by the driving power of the godet drive.

Likewise, the godet as disclosed in EP 0 770 719 A1 has similar disadvantages. In this case, the pole ends directly face the rotating components of the godet with a bearing gap.

It is an object of the invention to improve a godet of the initially described type by means of radially operative magnetic bearings such that the lowest possible losses occur in the magnetic bearings.

A further object of the invention is to minimize a mutual influence of the rotating components of the godet with the parts of the magnetic bearing.

SUMMARY OF THE INVENTION

The above and other objects and advantages of the present invention are achieved by the provision of a godet which comprises an elongate support and a tubular godet casing which is rotatably mounted upon the support for rotation about a central axis which is defined by the support. A plurality of bearings rotatably mount the casing to the support, and at least one of the bearings comprises a radially acting magnetic bearing (also referred to herein as a radially operative magnetic bearing) which includes a stationary part mounted to the support and a rotating part mounted to the casing so as to form a bearing gap therebetween. Also, the stationary part includes at least one pole element having an excitation winding, and the rotating part includes a separate component of a magnetizable material, with the pole element and the separate component cooperating for guiding a magnetic flux.

The invention distinguishes itself in that the rotating part of the magnetic bearing is formed by a separate component, which is preferably in the form of a laminated or layered component, that is secured to an inner side of the casing of the godet. By reason of the separate laminated component, the casing itself need not have the magnetizability that is needed for the operation of the bearing. Both the pole element of the stationary part and the laminated component of the rotating part cooperate for guiding the magnetic flux.

When constructing the laminated component and selecting the material therefor, it is thus possible to take into account the requirements of little hysteresis losses as well as little eddy current losses. As a result, the losses of the magnetic bearing are considerably reduced, so that it possible to avoid additional power from the drive. Even in the case of high carrying forces, only little heating occurs in the laminated component.

In a particularly preferred embodiment, the laminated component is directly attached to the inner side of the godet casing. To this end, one may embed the laminated component in a channel in the godet casing for saving space, or attach it in a simple manner directly to the surface of the inner side. In so doing, one must make sure that the laminated component faces the pole ends of the pole elements in a radially spaced relationship for purposes of ensuring a magnetic flux with the least possible interference for building up the bearing forces.

As a function of the direction of the excitation windings of the pole elements, the pole ends may be arranged relative to each other such that the magnetic flux has a circumferential or an axial orientation. To keep the losses as small as possible in the case of a circumferentially oriented magnetic flux, it is preferred to construct the godet of the invention so that the laminated component is composed of a plurality of disk-shaped sheet metal rings that are joined in an axial side-by-side relationship to form a laminated sleeve, and with the rings being insulated against each other and being slit so as to not form closed electrical loops. In this connection, the sleeve shaped laminated component extends over the pole ends. In the case of an axially oriented magnetic flux, it is preferred to form the laminated component from a plurality of thin sheet metal segments which are substantially flat and extend in a radial direction. The sheet metal segments are joined one after the other in the circumferential direction to form a closed laminated sleeve extending over at least one or preferably both pole ends. In the case that the laminated component covers only one pole end, a further laminated component may be associated to the second pole end for guiding the magnetic flux.

The configuration of the laminated component from a plurality of disk-shaped, thin sheet metal rings or sheet metal segments has the special advantage that the hysteresis losses and the eddy current losses can be reduced quite considerably. The disk-shaped sheet metal rings or segments are secured as one structural member to the godet casing. It is preferred to interconnect the individual sheet metal rings or segments using an insulating material.

A particularly preferred further development of the invention, wherein an insulating layer is formed between the godet casing and the laminated component for avoiding a heat exchange and/or a magnetic leakage flux between the laminated component and the godet casing, distinguishes itself by a drastic reduction of interactions. This further development is thus suited in particular for godets whose casing is heated for thermally treating a yarn advancing over the circumference of the godet casing. The insulating layer between the godet casing and the laminated component thus prevents an unacceptable thermal load on the laminated component.

In a very advantageous manner, it is possible to form the insulating layer by an undulated ring, which is supported by means of external undulations on the inner side of the godet casing. As a result of the small contact surface, an additional separation is achieved between the laminated component and the godet casing.

It is also possible to associate a cooling medium to the laminated component for dissipating the heat that develops in the laminated component because of eddy current losses or because of external actions. With that, it is possible to maintain in the laminated component with advantage the favorable characteristics for guiding the magnetic flux.

It is preferred to use as coolant a fluid stream producer, which generates a cooling fluid flow, preferably a cooling air stream, that moves, for example, through bores inside the laminated component or along a plurality of cooling ribs on the surface of the laminated component.

Preferably, the stationary part of the magnetic bearing comprises a plurality of pole elements with a plurality of windings, which are evenly arranged on the circumference of the support. In this connection, an advantageous further development of the invention provides for associating a common laminated component to the pole elements in a single bearing plane.

In another embodiment of the invention, the pole elements are arranged in a plurality of bearing planes. This leads to an equalization of the distribution of positions in which a force is introduced for a radial bearing mount of the godet casing. Preferably, one of a plurality of laminated components is associated to each bearing plane. Besides the high load bearing capacity, this allows a rigidity of the bearing mount with little losses to be achieved, which reduces a tendency to deformation, in particular in the case of long projecting godets.

To ensure a cooperation of all windings of the magnetic bearing, an advantageous further development of the invention provides for associating to each pole element a sensor for monitoring the bearing gap or for monitoring the position of the godet casing. The sensors and windings of the pole elements connect to a control unit so that each signaled bearing gap deviation can be immediately corrected. In this process, it is preferred to have the control unit activate the windings of a pole element individually. However, it is also possible to control with the control unit a plurality of windings of a plurality of pole elements of a bearing plane in paired relationship.

In the case of long godets, it is preferred to support the godet casing by means of two radially operative magnetic bearings which are provided in spaced relationship. For receiving axial forces, the godet casing may be additionally supported by a thrust bearing. Likewise, the thrust bearing could be constructed as an axially operative magnet bearing for obtaining a noncontacting guidance, so as to enable higher speeds of the godet casing.

BRIEF DESCRIPTION OF THE DRAWINGS

In the following, several preferred embodiments of the godet according to the invention are described in greater detail with reference to the attached drawings, in which:

FIGS. 4.1 and 4.2 are transverse sectioned views taken along the lines A-A and B-B respectively;

FIG. 5.1 is a transverse sectioned view of another embodiment of the invention; and FIG. 5.2 is an axially sectioned fragmentary view of one of the pole elements shown in FIG. 5.1.

DETAILED DESCRIPTION OF THE PREFERRED EMBODIMENTS

Figure 1:
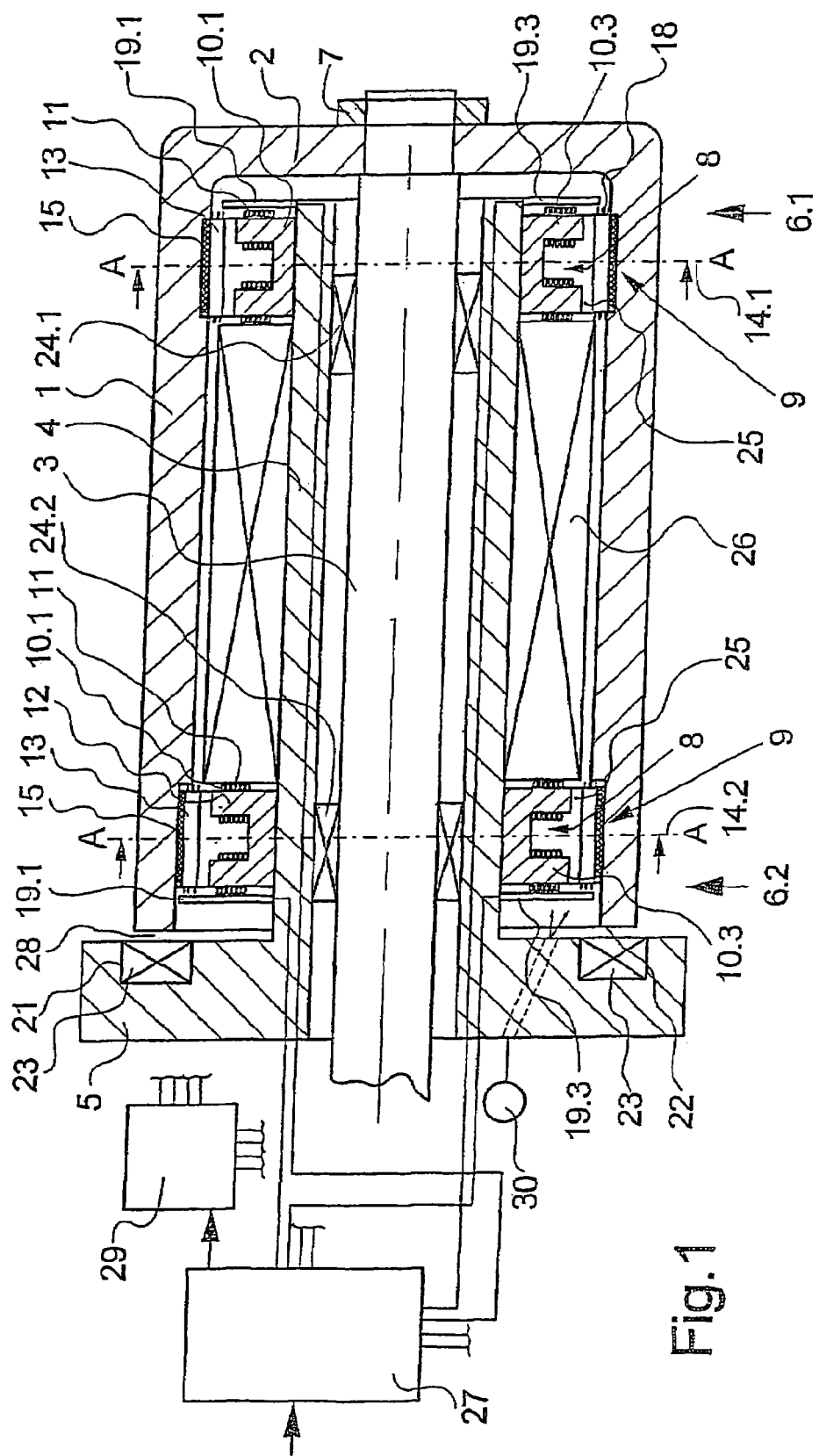
FIG. 1 is an axially sectioned partially schematic view of a first embodiment of a godet according to the invention.
Figure 2:
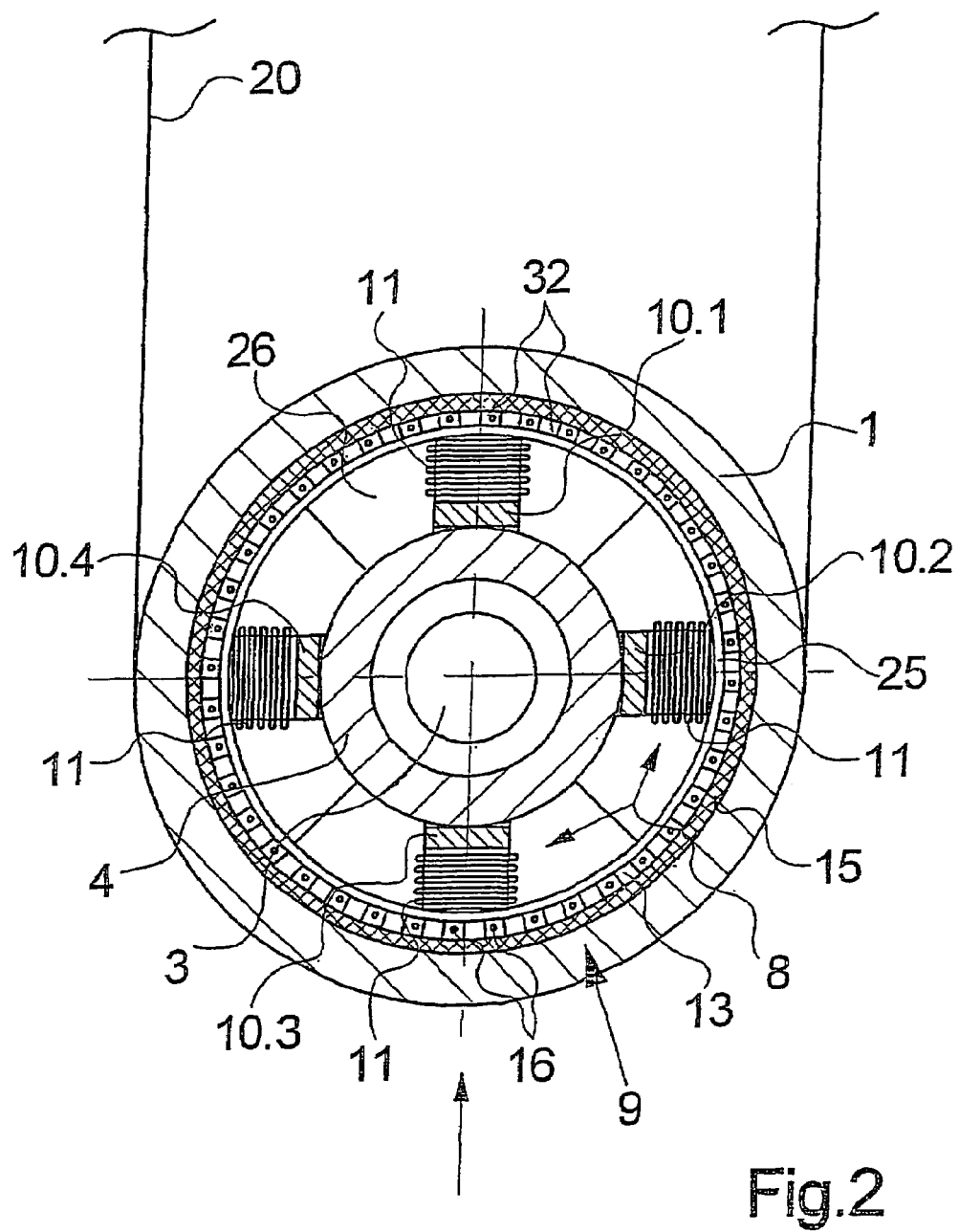
FIG. 2 is a transverse sectioned view taken along either of the lines A-A of FIG. 1.

FIGS. 1 and 2 schematically illustrate a first embodiment of the godet according to the invention. FIG. 1 illustrates the parts of the godet that are relevant to the invention, by means of a sectional view extending parallel to and through the axis of rotation, and FIG. 2 schematically illustrates a sectional view perpendicular to the axis of rotation of the godet. Thus, the following description applies to both Figures, unless express reference is made one of the Figures.

The embodiment of the godet as shown in FIGS. 1 and 2 comprises a tubular casing 1, which connects for corotation via an end wall 2 to a drive shaft 3 extending in the interior of the godet casing 1. To this end, the end of the drive shaft 3 mounts a clamping element 7 for securing the godet casing 1. With its opposite end, the drive shaft 3 connects to a drive (not shown). This drive could be, for example, an electric motor.

The godet casing 1 is mounted to a projecting support 4 by means of two radially operative magnetic bearings 6.1 and 6.2. The support 4 is made hollow-cylindrical, and it extends inside the godet casing 1 almost as far as the end wall 2, with the drive shaft 3 extending through the hollow-cylindrical support 4. On the side opposite to the end wall, the support 4 is secured via a collar 5 to a machine frame (not shown).

The magnetic bearings 6.1 and 6.2 are of identical construction, so that the following description applies to both magnetic bearings. Each magnetic bearing is composed of a stationary part 8, which is attached to the support 4, and a rotating part 9, which connects to the inner side of godet casing 1, and rotates therewith. The stationary part 8 of the magnetic bearing is formed by a plurality of pole elements, which are evenly distributed over the circumference of the support 4. In the illustrated embodiment, four pole elements 10.1-10.4 constitute the stationary part 8 of the magnetic bearing. Each of the pole elements is made U-shaped and includes pole ends 12. The legs of the U-shaped pole elements 10.1-10.4 mount excitation windings 11 that connect to an energy supply unit 29. The excitation windings 11 and the ends 12 of a pole element are configured such that they generate an axially oriented magnetic field.

The pole elements 10.1-10.4 are arranged in a bearing plane 14.1, 14.2, each 90° out of phase on the circumference of the support 4.

The rotating part 9 of the magnetic bearing is formed by a laminated component 13 and an insulating layer 15 joined to the laminated component 13, which are jointly attached to the inner side of godet casing 1. The laminated component 13 is formed by a number of thin-walled sheet metal segments 32, which are substantially flat and circumferentially joined, one following the other, to form a laminated sleeve. An insulating material interconnects the sheet metal segments. Likewise the insulating layer 15 is made in the shape of a sleeve, and completely surrounds the sleeve-shaped laminated component 13. The laminated component 13 extends in the axial direction so far that the ends 12 of pole elements 10.1-10.4 are completely covered, and a bearing gap 25 is formed between the ends 12 of pole elements 10.1-10.4 and the laminated component 13, so that it is possible to generate a magnetic force between the pole elements 10.1-10.4 and the laminated component 13. The pole elements 10 may be formed of a solid material or a plurality of laminations, which are stacked one after the other in the radial and/or axial directions.

The magnetic bearings 6.1 and 6.2 extend in spaced relationship over the circumference of the support 4, with the magnetic bearing 6.1 being located adjacent the free end of the support 4, and the magnetic bearing 6.2 being located in the region of the rigidly secured end of the support 4. Between the magnetic bearings 6.1 and 6.2, a heating device 26 is arranged on the circumference of the support 4 for heating the godet casing 1. The heating device 26 could be formed, for example, by one or more windings, which would cause the godet jacket to be heated by induction.

Associated to each pole element 10.1-10.4 of the magnetic bearings 6.1 and 6.2 is a sensor, with only two of the sensors 19.1; 19.3 being seen in FIG. 1. The sensors are provided in the form of distance sensors for determining the position of the godet casing 1. To this end, the free ends of the sensors are arranged at a short distance from an inner side of the godet casing 1. The four sensors of each of the magnetic bearings 6.1 and 6.2 connect via signaling lines to a bearing control unit 27. The bearing control unit 27 connects via the energy supply unit 29 to the excitation windings 11 on the pole elements 10.1-10.4 of magnetic bearings 6.1 and 6.2.

As can be noted from the illustration of FIG. 1, the diameter of the collar 5 of the support 4 is greater than the diameter of godet casing 1. The collar 5 of the support 4 includes an annular groove 21 on the side facing the godet casing 1 that accommodates a thrust bearing 23. The thrust bearing 23 is constructed as an axially operative magnetic bearing, which forms together with an end face 22 of godet casing 1 an axial bearing gap 28.

In the interior of the support 4, two backup bearings 24.1 and 24.2 are arranged in spaced relationship between the drive shaft 3 and the support 4. These bearings ensure a reliable startup of the godet, or they assist in a startup irrespective of the magnetic bearings. The use of backup bearings may include, for example, plain and antifriction bearings.

The embodiment of the godet as shown in FIGS. 1 and 2 may be used for advancing, thermally treating, and drawing yarns. In these process steps, high tensions are generated in the yarns, which lead during the operation to a largely static load of the godet. The load is directly introduced into the circumferential region of the godet casing 1 that is looped by one or more yarns.

During the operation, the four sensors (19.1; 19.3 being shown) measure the actual position of the godet casing 1 in the region of bearing planes 14.1 and 14.2, and supply the measured values to the bearing control unit 27. In the bearing control unit 27, the measured values are used to determine the position of the godet casing 1 in the bearing planes 14.1 and 14.2, and the individual excitation windings 11 of the pole elements 10.1-10.4 of magnetic bearings 6.1 and 6.2 are activated in accordance with a desired correction of the position. With that, a substantially constant bearing gap 25 is maintained between the laminated component 13 and the ends 12 of the pole elements.

The layered construction of laminated component 13 is formed by joining a plurality of sheet metal segments 32, which makes it possible to prevent substantial hysteresis losses during the transition of the magnetic flux into the laminated component 13.

The heating device 26 heats the godet casing 1. To control the surface temperature of the godet casing, one or more temperature sensors (not shown) are provided, which connect via signal lines to a heating control unit, and thus enable a reference value adjustment of the surface temperatures.

To prevent an undesired heating of the laminated component 13 by heat transfer from the godet casing 1 to the laminated component 13, the laminated component 13 is separated from the godet casing by the insulating layer 15. The insulating layer 15 could be made, for example, from a nonmetal, for example, from a plastic. The insulating layer 15 and the laminated component 13 could be embedded at least in part in a channel formed in the godet casing as shown in FIG. 1 in the case of magnetic bearing 6.1, or they could be arranged on the surface of the inner side of godet casing 1 to directly project therefrom as shown in FIG. 1 in the case of magnetic bearing 6.2.

In cases in which an active cooling of the laminated component 13 is desired, radially peripheral cooling ribs 18 could be formed on the end faces of the laminated component 13, as shown in FIG. 1.

In addition, the laminated component 13 could include a plurality of axially extending bores 16, which allow air to pass therethrough for cooling the laminated component 13 as shown in FIG. 2.

To generate a cooling fluid stream, a fluid stream producer 30 is provided, which directs a cooling fluid stream, preferably a cooling air stream, into the interior of the godet casing 1, as shown in FIG. 1. The components 16, 18, and 30 as provided for cooling the laminated component 13 are exemplary and used only in the case that an overheating of the laminated component 13 is to be expected.

Figure 3:
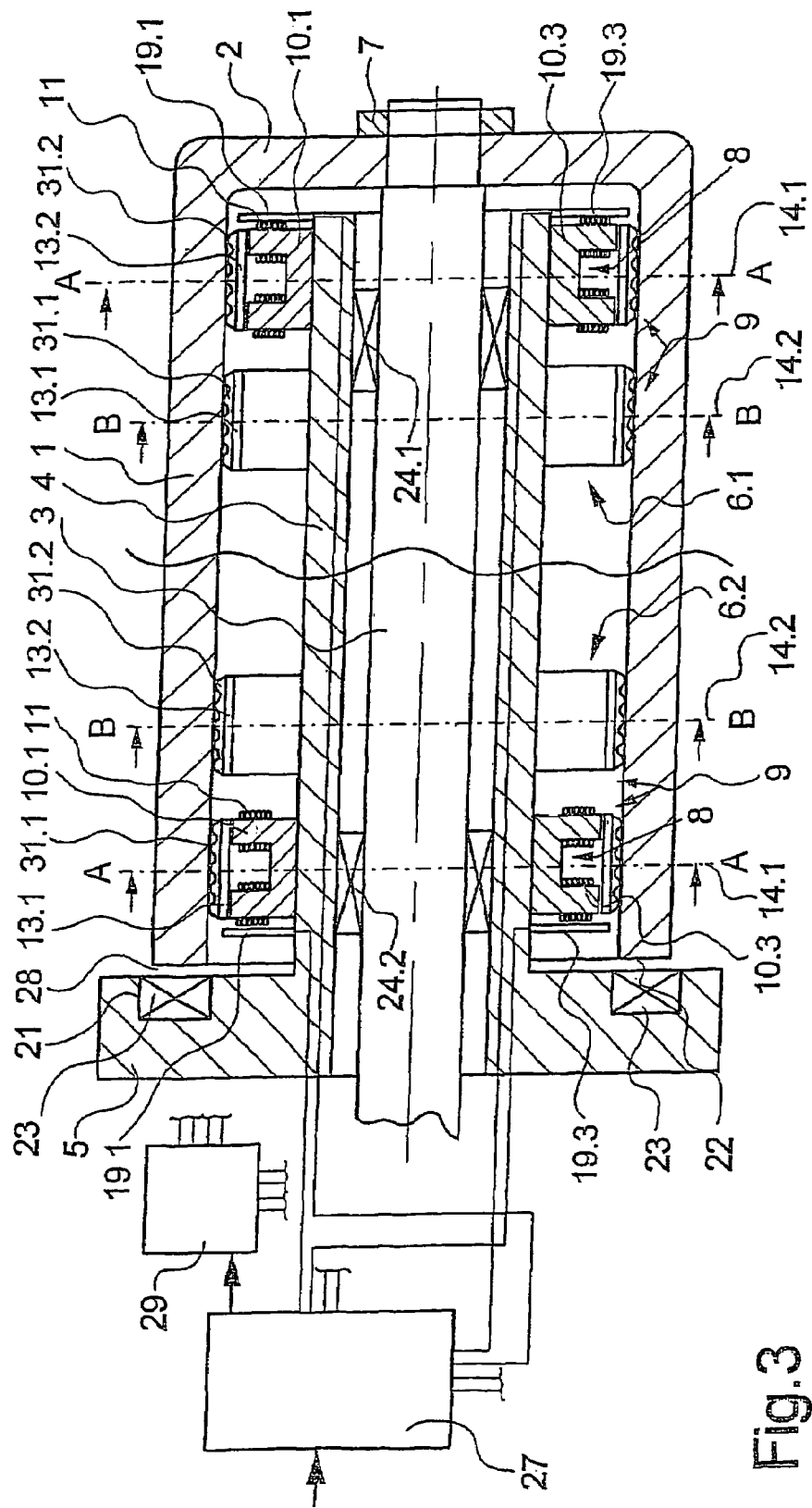
FIG. 3 is a view similar to FIG. 1 and illustrating a second embodiment of the invention.

A further embodiment of a godet according to the invention is shown in FIGS. 3, 4.1, and 4.2, with FIG. 3 being a schematic, axially sectioned view of the embodiment, and FIGS. 4.1 and 4.2 each being a cross sectional view of a different bearing plane of a magnetic bearing. The components of the same function are provided with identical numerals.

In essence, the embodiment of FIGS. 3, 4.1, and 4.2 corresponds to the embodiment of the godet shown in FIGS. 1 and 2, so that the following describes only the essential differences. This embodiment comprises a long projecting support 4, which is unilaterally mounted to a machine frame (not shown). The support 4 mounts for rotation the tubular godet casing 1. To support the godet casing 1, radially operative magnetic bearings 6.1 and 6.2 as well as a thrust bearing 23 are provided. The magnetic bearings 6.1 and 6.2 are identical, so that the following description applies to both magnetic bearings. In each magnetic bearing, the stationary part 8 is formed by a plurality of pole elements 10.1-10.4. The pole elements 10.1-10.4 are distributed over two juxtaposed bearing planes 14.1 and 14.2. In each bearing plane, two pole elements are arranged in oppositely facing relationship on the circumference of the support 4. The pole elements are U-shaped and mount on each leg an excitation winding 11. The legs form the ends 12 of the pole elements, and guide in operation an axially oriented magnetic flux.

In each bearing plane 14.1 and 14.2, a laminated component 13.1; 13.2 is associated with the pole elements of the respective bearing plane. The laminated component is made in the shape of a sleeve and secured to the inner side of godet casing 1 via an insulating layer, which is formed by an undulated ring 31.1; 31.2. This provides in an advantageous manner a small contact surface between the godet jacket 1 and the insulating layer on the one hand, and between the laminated component 13.1; 13.2 and the insulating layer on the other hand.

In the embodiment shown in FIGS. 3, 4.1, and 4.2, the pole elements 10.1 and 10.3 of the bearing plane 14.1 are associated with laminated component 13.1, and the pole elements 10.2 and 10.4 in the bearing plane 14.2 are associated with laminated component 13.2. The laminated component could also be formed, for example, by a one-piece ring, which is made of a magnetizable material. However, it is also possible to build the laminated component from a plurality of disk-shaped sheet metal rings or sheet metal segments, as described above.

Associated with the pole elements 10.1-10.4 are four sensors (19.1 and 19.3 being shown). The excitation windings 11 of the pole elements 10.1-10.4 connect together with the sensors to the bearing control unit 27. With this arrangement it becomes possible to control each of the pole elements independently of adjacent pole elements. In so doing, the bearing gap 25 that forms between the ends 12 of the pole elements 10.1-10.4 and the laminated component 13.1 and 13.2 is kept substantially constant.

FIG. 5.1 is a sectional view of a godet, for example, the godet of FIGS. 1 and 2, with a further embodiment of a magnetic bearing. While FIG. 5.1 is a complete sectional view perpendicular to the axis of rotation of the godet, FIG. 5.2 shows only a cutout of an axially sectioned view of the godet. Components of like function have been provided with like numerals.

The construction of the godet of FIGS. 5.1 and 5.2 substantially corresponds to the embodiment of FIGS. 1 and 2, so that the foregoing description is herewith incorporated by reference, and only differences are described in the following.

The godet casing 1 is supported by means of at least one radially operative magnetic bearing 6 on a projecting support 4. The support 4 is made hollow-cylindrical, with the drive shaft 3 extending therethrough.

The magnetic bearing 6 is composed of a stationary part 8, which is mounted to the support 4, and a rotating part 9, which is mounted to the inner side of the godet casing 1, and rotates with the godet casing 1. The stationary part 8 of the magnetic bearing 6 is formed by a plurality of pole elements 10.1-10.4, which are evenly distributed over the circumference of the support 4. In the present embodiment, the stationary part 8 of the magnetic bearing 6 is formed by four pole elements 10.110.4. Each of the pole elements is U-shaped and includes the pole ends 12. The legs of the U-shaped pole elements 10.1-10.4 mount excitation windings 11 that connect to an energy supply unit (not shown). The excitation winding 11 and the ends 12 of a pole element 10 are configured such that they generate a radially oriented magnetic field. To this end, the ends 12 of the U-shaped pole elements face each other in the circumferential direction of the godet casing 1.

The pole elements 10.1-10.4 are arranged in a bearing plane, each 90° out of phase, on the circumference of the support 4.

The rotating part 9 of the magnetic bearing 6 is formed by a laminated component 13 and an insulating layer 15 connected thereto, which are jointly embedded in a channel formed in the inner side of the godet casing 1. The insulating layer 15 is made in the shape of a sleeve and completely surrounds the sleeve-shaped laminated component 13. The insulating layer 15 also extends over the opposite end faces of the laminated-component 13.

The laminated component 13 is built from a plurality of disk-shaped, thin-walled sheet metal rings 33, which are joined, one following the other in the axial direction of the godet casing 1, to form a laminated sleeve. The sheet metal rings 33 are interconnected by an insulating material. The laminated component 13 extends in the axial direction a distance sufficient so that it completely extends over the ends 12 of the pole elements 10.1-10.4. A bearing gap 25 is formed between the ends 12 of the pole elements 10.1-10.4 and the laminated component 13, so as to permit generating a magnetic force between the pole elements 10.1-10.4 and the laminated component 13. The pole elements may be built from a solid material or from a plurality of sheet metal elements that are stacked one after the other in the radial and/or axial directions.

In operation, sensors measure the actual position of the godet casing 1 in the region of the bearing plane, and the measured values are supplied to the bearing control unit. In the bearing control unit, the measured values are used to determine the position of the godet casing 1 in the bearing plane, and the individual excitation windings 11 of the pole elements of the magnetic bearing 6 are activated in accordance with a desired correction of the position. With that, a substantially constant bearing gap 25 forms between the laminated component 13 and the ends 12 of the pole elements. As a result of the layered construction of the laminated component 13 by joining a plurality of sheet metal rings 33, no significant hysteresis losses occur during the transition of the magnetic flux into the laminated component.

The invention is not limited to the embodiments of the godet according to the invention and as shown in the figures. For example, the support 4 could be made as a solid axle, whose circumference would include cutouts for receiving the pole elements. A rotatable godet casing could extend over the circumference of the axle. The construction of the magnetic bearings 6 could be adopted without modification.

The invention likewise comprises embodiments, wherein the drive shaft is magnetically supported. To this end, the pole elements of the magnetic bearings are arranged inside a hollow-cylindrical support. The circumference of the shaft could mount a laminated component, which would extend with the pole elements in a bearing plane. Common to all embodiments which are not shown is that the rotating part of the magnetic bearing is formed by a separate laminated component, which is secured to one of the rotating components of the godet.

The invention claimed is:

1. A godet for guiding at least one yarn on a circumferential surface thereof, comprising
   an elongate support which defines a central axis,
   a tubular godet casing,
   a plurality of bearings rotatably mounting said tubular godet casing upon the support for rotation about said central axis, at least one of said bearings comprising a radially acting magnetic bearing which comprises a stationary part mounted to the support and a rotating part mounted to the casing so as to form a bearing gap between the rotating and stationary parts, and wherein the stationary part comprises at least one pole element having at least one excitation winding, and wherein the rotating part includes a separate component of a magnetizable material, with the pole element and the separate component cooperating for guiding a magnetic flux, and wherein the separate component is of a laminated construction.

2. The godet of claim 1, wherein the separate component is secured to an inner side of the tubular godet casing in a projecting and/or an embedded manner, and wherein the laminated component radially opposes the ends of the pole element with a spacing that forms said bearing gap.

3. The godet of claim 1, wherein the laminated component is formed by a plurality of disk-shaped, thin sheet metal rings, which are joined in an axial side-by-side relationship for guiding a magnetic flux in the circumferential direction of the godet casing.

4. The godet of claim 1, wherein the laminated component is formed by a plurality of thin sheet metal segments, which are joined in a circumferential side-by-side relationship for guiding a magnetic flux in the axial direction of the godet casing.

5. The godet of claim 1, further comprising an insulating layer formed between the godet casing and the laminated component for avoiding a heat exchange and/or a magnetic flux leakage between the laminated component and the godet casing.

6. The godet of claim 5, wherein the insulating layer is formed by an undulated casing ring, which is supported via outer undulations on the inner side of the godet casing.

7. The godet of claim 1, further comprising a cooling system associated with the laminated component for dissipating heat that develops in the laminated component.

8. The godet of claim 7, wherein the cooling system comprises a fluid stream producer which generates a cooling fluid stream which is adapted to flow through a plurality of bores within the laminated component and/or along a plurality of cooling ribs on the laminated component.

9. The godet of claim 1, wherein the stationary part of the magnetic bearing comprises a plurality of pole elements with a plurality of respective windings, with the pole elements being arranged in a single bearing plane, and with a common laminated component being associated to the pole elements.

10. The godet of claim 1, wherein the stationary part of the magnetic bearing comprises a plurality of pole elements with a plurality of respective windings, with the pole elements being arranged in a plurality of bearing planes, and with a laminated component being arranged in each of said planes.

11. The godet of claim 10, wherein from bearing plane to bearing plane, at least some of the pole elements are arranged on the support with an angular displacement.

12. The godet of claim 1, wherein a sensor is associated with each of the pole elements for determining the position of the godet casing, and wherein the sensors and the excitation windings of the pole elements are connected to a bearing control unit.

13. The godet of claim 1, wherein the godet casing is supported by means of two radially operative magnetic bearings and one thrust bearing, with the stationary parts of the magnetic bearings comprising a plurality of pole elements with excitation windings, and the rotating parts of the magnetic bearings comprise a plurality of the laminated components.

* * * * *